US009450924B2

(12) United States Patent
Rangsikitpho et al.

(10) Patent No.: US 9,450,924 B2
(45) Date of Patent: *Sep. 20, 2016

(54) PRIVACY PROTECTED INTERACTIONS WITH THIRD PARTIES

(71) Applicant: trueX inc., Los Angeles, CA (US)

(72) Inventors: Joshua Rangsikitpho, Venice, CA (US); Aaron Stein, Los Angeles, CA (US)

(73) Assignee: TRUEX INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/467,793

(22) Filed: Aug. 25, 2014

(65) Prior Publication Data

US 2014/0365772 A1 Dec. 11, 2014

Related U.S. Application Data

(63) Continuation of application No. 13/174,238, filed on Jun. 30, 2011, now Pat. No. 8,819,425.

(51) Int. Cl.
*H04L 29/06* (2006.01)

(52) U.S. Cl.
CPC ....... *H04L 63/0428* (2013.01); *H04L 63/0414* (2013.01)

(58) Field of Classification Search
CPC .................... H04L 63/0428; H04L 63/0414
USPC ........................................................ 713/168
See application file for complete search history.

(56) References Cited

U.S. PATENT DOCUMENTS

| 5,592,611 | A | 1/1997 | Midgely et al. |
| 5,825,884 | A | 10/1998 | Zdepski et al. |
| 5,848,396 | A | 12/1998 | Gerace |
| 6,134,532 | A | 10/2000 | Lazarus et al. |
| 6,185,619 | B1 | 2/2001 | Joffe et al. |
| 6,219,692 | B1 | 4/2001 | Stiles |
| 6,223,209 | B1 | 4/2001 | Watson |
| 6,298,373 | B1 | 10/2001 | Burns et al. |
| 6,370,580 | B2 | 4/2002 | Kriegsman |

(Continued)

FOREIGN PATENT DOCUMENTS

| KR | 100890720 | 4/2008 |
| WO | 03032126 | 4/2003 |
| WO | 2009127771 | 10/2009 |

OTHER PUBLICATIONS

"An Update on Encrypted UID's," Facebook Developer Blog, Nov. 23, 2010, downloaded from http://developers.facebook.com/blog/post/431 on Jun. 10, 2011, 2 pages.

(Continued)

*Primary Examiner* — Michael S McNally
(74) *Attorney, Agent, or Firm* — Cantor Colburn LLP

(57) ABSTRACT

Various embodiments are directed to computer-implemented methods and systems for a site to facilitate privacy protected interactions between users of a site and a third party utility. For example, a computer may receiving from a user selected from the users of the site, a request to interact with the third party utility. The computer may also encrypt an identification of the user to generate an encrypted user identification associated with the third party utility; and provide the encrypted user identification and the request to the third party utility.

20 Claims, 11 Drawing Sheets

(56) References Cited

U.S. PATENT DOCUMENTS

| | | |
|---|---|---|
| 7,669,212 B2 | 2/2010 | Alao et al. |
| 7,680,746 B2 | 3/2010 | Agarwal |
| 7,958,204 B1 | 6/2011 | Phillips et al. |
| 2002/0046102 A1 | 4/2002 | Dohring et al. |
| 2004/0205348 A1 | 10/2004 | Watanabe et al. |
| 2005/0165623 A1* | 7/2005 | Landi et al. ............ 705/2 |
| 2006/0106710 A1 | 5/2006 | Meek et al. |
| 2006/0212348 A1 | 9/2006 | Lambert et al. |
| 2006/0293950 A1 | 12/2006 | Meek et al. |
| 2007/0240206 A1* | 10/2007 | Wu et al. ............ 726/8 |
| 2008/0033776 A1 | 2/2008 | Marchese |
| 2008/0065504 A1 | 3/2008 | Newmark et al. |
| 2008/0103877 A1 | 5/2008 | Gerken |
| 2009/0157494 A1 | 6/2009 | Kirovski et al. |
| 2009/0177588 A1 | 7/2009 | Marchese |
| 2009/0222348 A1* | 9/2009 | Ransom et al. ............ 705/14 |
| 2010/0005488 A1 | 1/2010 | Rakib et al. |
| 2010/0088170 A1 | 4/2010 | Glore, Jr. |
| 2010/0094673 A1 | 4/2010 | Lobo et al. |
| 2010/0198696 A1 | 8/2010 | Deshpande |
| 2010/0228617 A1 | 9/2010 | Ransom et al. |
| 2010/0241486 A1 | 9/2010 | Garg et al. |
| 2010/0250361 A1 | 9/2010 | Torigoe et al. |
| 2010/0287048 A1 | 11/2010 | Ramer et al. |
| 2011/0106630 A1 | 5/2011 | Hegeman et al. |
| 2011/0106721 A1 | 5/2011 | Nickerson et al. |
| 2011/0125572 A1 | 5/2011 | Cantu-Paz et al. |
| 2011/0137975 A1 | 6/2011 | Das et al. |
| 2012/0166274 A1 | 6/2012 | Krishnamoorthy |
| 2012/0232986 A1 | 9/2012 | Baiz Matuk |

OTHER PUBLICATIONS

"Canvas Encryption Proposal," Facebook Developer Blog, downloaded from http://developers.facebook.com/docs/authentication/canvas/encryption_proposal on Jun. 7, 2011, 7 pages.

"Encrypting Facebook UID's," Facebook Developer Blog, Oct. 21, 2010, downloaded from http://developers.facebook.com/blog/post/419 on Jun. 10, 2011, 1 page.

"Facebook in Privacy Breach, Top-Ranked Applications Transmit Personal ID's, a Journal Invetigation Finds," The Wall Street Journal, Oct. 18, 2010, retrieved from the Internet on Jun. 6, 2011, 3 pages.

"What is Cost Per Engagement (CPE)?," Brickfish, Social Mecca, Inc., Mar. 14, 2012, 5 pages., [Online] [Retrieved on Feb. 22, 2013] Retrieved from the Internet<URL:http://blog.brickfish.com/2012/03/14/what-is-cost-per-engagement-cpe/>.

PCT International Search Report and Written Opinion, PCT Application No. PCT/US2012/043844, Jan. 21, 2013, 12 pages.

\* cited by examiner

PRIVACY PROTECTED INTERACTIONS WITH THIRD PARTIES

CROSS REFERENCE TO RELATED APPLICATIONS

This application is a continuation application of U.S. patent application Ser. No. 13/174,238, filed Jun. 30, 2011, which is incorporated by reference herein in its entirety.

BACKGROUND

The proliferation of social networking and other similar sites on the Internet has provided many new opportunities for users to interact with other users, as well as third parties such as advertisers, providers of applications or "apps," and other businesses. The third parties enrich users' online experience by offering users access to products, services, and promotional offers. Often, however, it is difficult for users to interact with third parties while also protecting their own privacy. For example, some advertisers seek personal information about users for market research and targeting. The use policies of many sites require third parties to request permission from a user before receiving and using a user's personal information in this way. Whether by design or accident, however, user personal data sometimes reaches third parties without permission. Also, sometimes it is desirable or even necessary for the third party to have functional access to user personal information. For example, third parties must be able to identify users in order to provide products, services and promotional offers.

DRAWINGS

DESCRIPTION

Various example embodiments are directed to systems and methods for facilitating privacy protected interactions between users and third parties. In some example embodiments, the systems and methods described herein may be utilized in the context of a social networking site for facilitating interactions between users. The social networking site may allow the one or more users to interact with one another, and with the third parties. Examples of social networking sites may include, for example, MYSPACE, FACEBOOK, TWITTER, etc. Users of social networking sites may sometimes be referred to as social publishers. For example, the users may publish content to the site. This content, referred to as social content or user-generated content, may include text, images, media files, links to other Internet resources, etc. A user's social content may be viewable by other users of the site (e.g., other users associated with the user or by all users). The third parties may include any third parties that wish to interact with the users via the site. For example, in the context of a social networking site, the third parties may be, for example, advertisers, advertising intermediaries, developers of applications or "apps," etc. In various example embodiments, the third parties may offer promotions to the users.

According to various example embodiments, privacy protected interactions may be facilitated by encrypting to the third party data identifying the user, such as a user identification or user ID. For example, an outbound communication from the user to the third party may be intercepted by the site, which may encrypt any reference in the communication to the user's ID. Communications from the third party to the user may also be routed through the site and may, in various example embodiments, reference the encrypted user ID. The site may decrypt the encrypted user ID and process the third party communication with respect to the identified user. The third party may utilize the encrypted ID, for example, for internal book-keeping to enumerate the number of unique users contacting the third party and, for example, to request that the site take action relative to a particular user. Because the third party never receives the user ID in the clear, the user's privacy may be maintained. Although various example embodiments are described in the context of a social networking site, it will be appreciated that the systems and methods described herein may also be utilized in any context wherein users of a site or other intermediate system interact with third parties in privacy-protected interactions.

Figure 1:
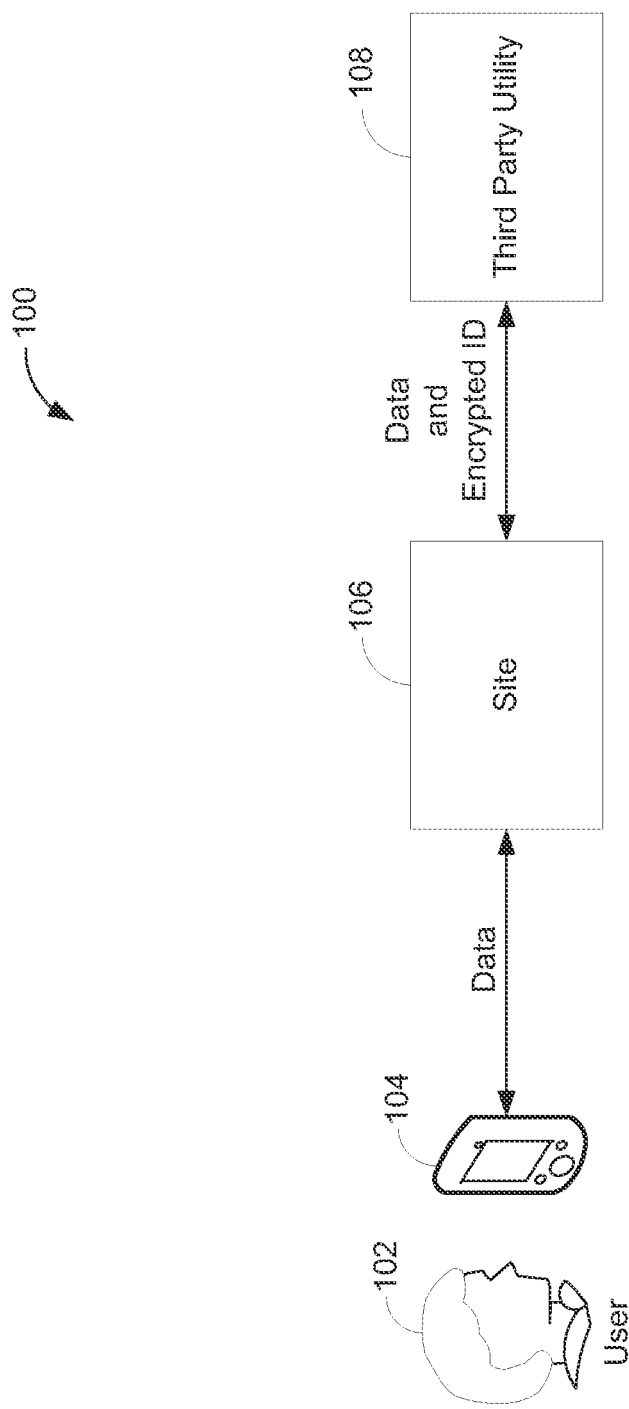
FIG. 1 shows one example embodiment of a system for facilitating privacy protected interactions between a user and a third party utility via a site.

FIG. 1 shows one example embodiment of a system 100 for facilitating privacy protected interactions between a user 102 and a third party utility 106 via a site 106, which may be a social networking site. The site 106 may act as an intermediary between the user 102 and the third party utility 106. The site 106 may be any suitable type of site (e.g., a World Wide Web or other Internet site). In various example embodiments, the site 106 may comprise functionality and/or content that is served to the user 102 by a server or other piece of suitable computer equipment over any suitable medium. The functionality and/or content provided by the site may be generated by the site 106, the user 102, other users of the site 106 or, in some example embodiments, the third party utility 108 (e.g., as described herein). The user 102 may access the site 106 via a user device 104. The user device 104 may be any suitable type of computer device including, for example, a personal digital assistant (PDA), smart phone, laptop computer, desktop computer, tablet computer, etc.

The third party utility 108 may be executed on behalf of a third party by a server or other computer in communication with the site 106 via a network (e.g., the Internet). Via the site 106, the third party utility 108 may provide various functionality and/or content to the user 102. For example, the third party utility 108 may provide advertising and/or advertising-related promotions to the user. In some example embodiments, the third party utility 108 may provide interactive content and/or functionality to the user 102. For example, the third party utility 108 may provide the user 102 with promotions whereby the user 102 performs one or more actions for the third party in return for compensation. The action or actions may include, for example, incorporating an advertised brand into social content published to the site 106, viewing advertising content, taking a survey, etc. The compensation may include anything that may be of value to the user 102. For example, the compensation may comprise cash or products. In some example embodiments, the compensation may comprise promotional items associated with the site 106 (e.g., social networking credits). For example, the compensation may include credits for purchasing applications, games and/or constituent parts thereof through the site 106.

In various example embodiments, the site 106 may be a social networking site allowing the user 102 and various other users to publish social content. For example, the site 106 may provide a social networking interface to the user 102. The social networking interface may comprise social content that may be provided by social network users of the site 106 including, for example, the user 102. The social networking content may also comprise content from the third party utility 108 (e.g., a content link to content and/or functionality off of the site 106), for example, as described herein below.

Figure 1A:
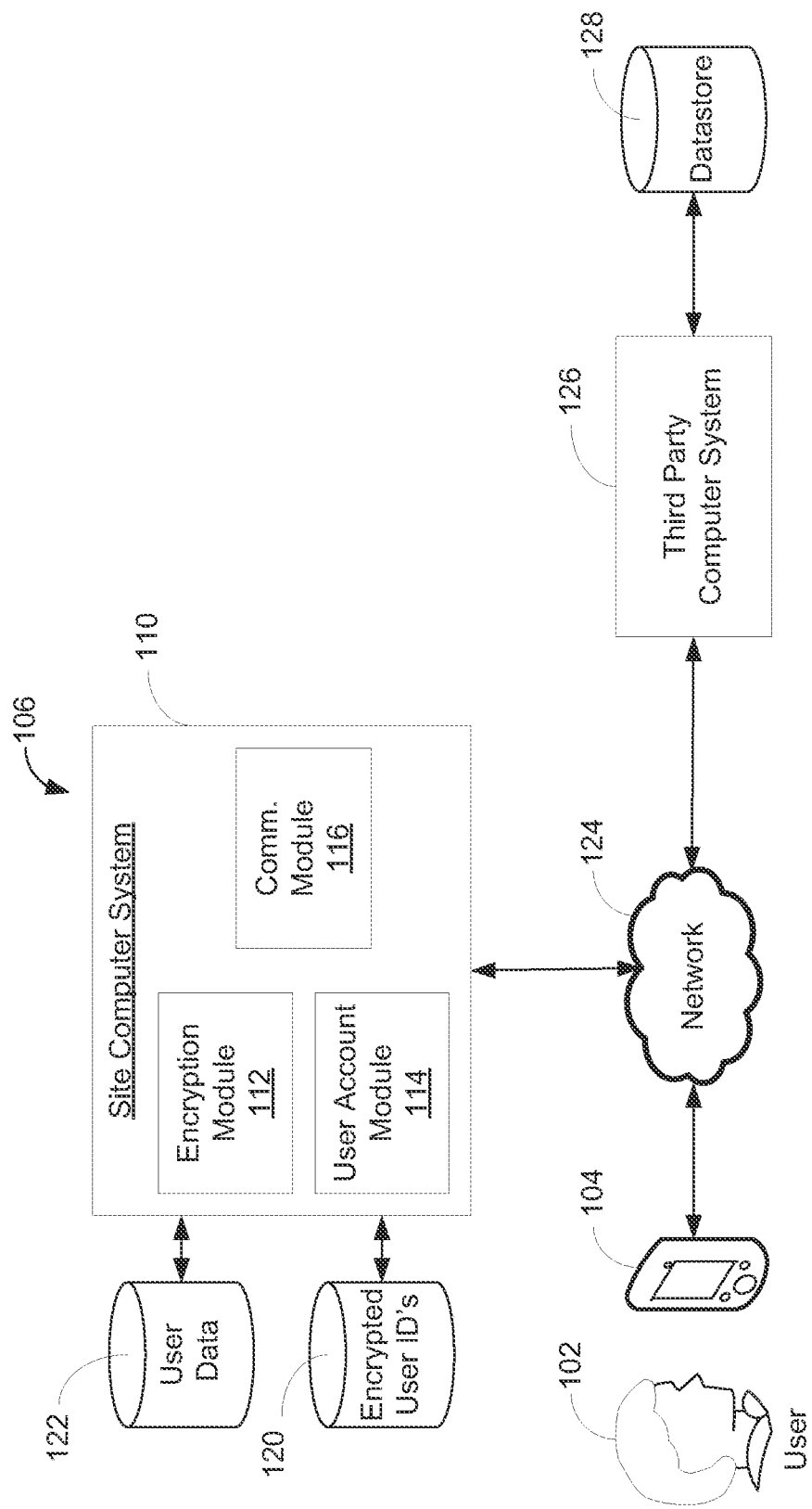
FIG. 1A shows one example embodiment of the system of FIG. 1 illustrating additional details of various components.

FIG. 1A shows one example embodiment of the system 100 illustrating additional details of various components. For example, the site 108 and the user 102 (via user device 104) are illustrated to be in communication with one another via a network 124. The network 124 may be any suitable type of wired, wireless or mixed network including, for example, a local area network (LAN), a wide area network (WAN), etc. In various example embodiments, the network 124 may be and/or utilize the Internet. The third party utility 108 may also be in communication with the site 106 via the network 124. Although the third party utility 108 and the user 102 are both shown to be in communication with the site 106 via a common network 124, it will be appreciated that, in some example, embodiments, the user 102 and the third party utility 108 may be in communication with the site 106 via different networks. For example, in some embodiments, one or both of the user 102 and the third party utility 108 may be in communication with the site 106 via a private and/or proprietary network.

As illustrated in FIG. 1A, the site 106 may be provided by a site computer system 106. The site computer system 106 may comprise one or more computers or computer devices including, for example, one or more servers. The site computer system 106 may comprise at least one processor and operatively associated memory for executing computer instructions. Computer instructions for implementing the site 106 may be stored by the site computer system 106, for example, at a non-volatile data storage device such as a disk drive. The instructions may, when executed by the at least one processor, cause the site computer system 106 to implement various functional modules 112, 114, 116. Each module, for example, may cause the site computer system 106 to perform one or more tasks that may be related to facilitating privacy-protected interactions, as described herein. The modules may be embodied as any suitable form of software construct and may include and/or utilize any form of processes, tasks, dynamically linked libraries (.dll's), objects, object oriented methods, etc.

A user account module 114 may manage the account of the user 102 (and, for example, accounts of other users of the site 106). The user account module 114 may track various properties of the account of the user 102. For example, in various example embodiments, the user account module 114 may track promotional items and/or credits associated with the user's account. These may include, for example, credits for purchasing applications, games and/or constituent parts through the site 106 and/or one of the third party utilities 108. In various embodiments, the user account module 114 may maintain data describing the accounts of different users (including the user 102) at a user data store 122. The user data store 122 may be implemented using any suitable logical and physical data location, for example, utilizing any type of data storage hardware (e.g., non-volatile storage hardware).

An encryption module 112 may manage the encryption of user ID's. For example, the encryption module 112 may implement one or more encryption algorithms to encrypt the user's ID. Example encryption algorithms that may be implemented by the encryption module 112 are described herein below. In various embodiments, the encryption module 112 may also track associations between encrypted and unencrypted user ID's. In various example embodiments, the encryption module 112 may implement a user ID encryption function that may be callable by one or more of the other modules 112, 114, 116. For example, the function may receive as input a clear user ID and a particular third party utility 108. As output, the function may provide an encrypted user ID associated with the third party utility. The encrypted user ID may be generated by the encryption module 112 and/or recalled from a list of previously encrypted user ID's. Encrypted user ID's may be maintained at any suitable logical and/or physical data location. In some example embodiments, encrypted user ID's may be stored at the user data store 122, for example, in association with the relevant user. Also, in some example embodiments, encrypted user ID's may be stored at a dedicated logical and/or physical encrypted user ID data store 120.

A communication module 116 may manage communications between the third party utility 108 and the user 102 that are routed via the site computer system 106. For example, the communications module 116 may receive and otherwise process communications from the user 102 directed to the third party utility 108 and from the third party utility directed to the user 102. In various example embodiments, the communications module 116 may call and/or utilize other modules to complete privacy protected transactions, as described herein. For example, upon receiving a communication from the user 102 to the third party utility 108, the communication module 116 may call the encryption management module 114 to provide an encrypted user ID. Similarly, upon receiving a communication and/or instruction from the third party utility 108, the communication module may provide a received encrypted user ID to the encryption module 114 and return a clear user ID. In various embodiments, the communications module 116 may also handle requests from the third party utility 108 to perform an action on behalf of the user 102 upon request of the third party utility 108. For example, upon receiving a request from the third party utility 108 (and verifying the proper clear identity of the user 102), the communication module may add promotional items and/or credits to the account of the user 102 per the request.

The third party utility 108 is shown executed by a third party computer system 126. The third party computer system 126 may be any suitable type of computer system and, in various embodiments, may comprise one or more processors and operatively associated memory for executing the third party utility 108. Various data for executing the third party utility 108 may be stored, for example, at a data store 128. It will be appreciated that the functionality of the site computer system 106, as described herein, may be divided in any suitable manner. For example, different embodiments may not include all of the functional modules 112, 114, 114, 116 described herein or may, in some example embodiments, include additional functional modules (not shown).

Figure 2:
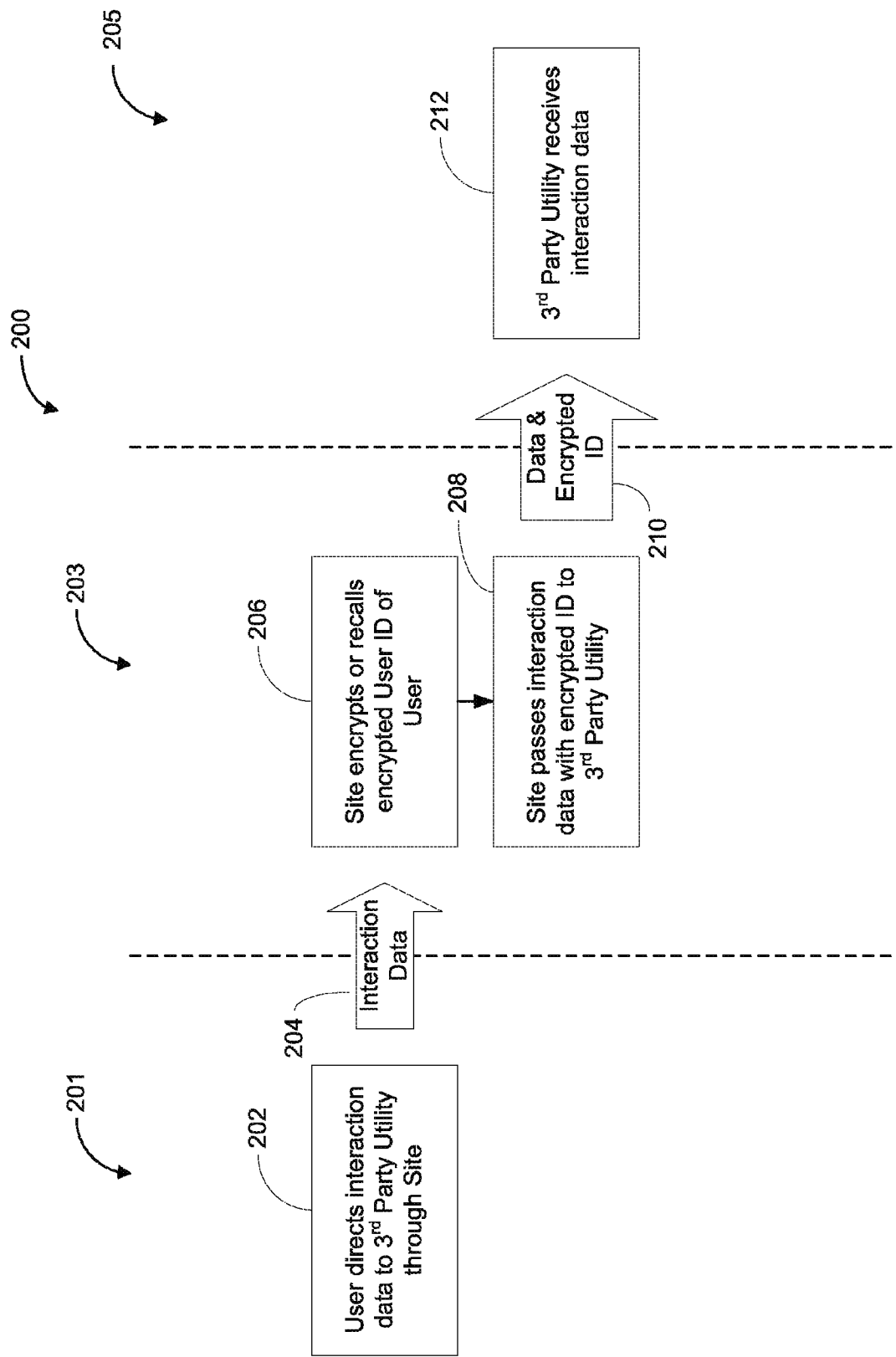
FIG. 2 shows one example embodiment of a process flow showing a privacy protected interaction between the user and the third party utility with data traveling from the user to the third party utility.

FIG. 2 shows one example embodiment of a process flow 200 showing a privacy protected interaction between the user 102 and the third party utility 108 via the site 106 with data traveling from the user 102 to the third party utility 108. The process flow 200 is illustrated with three columns 201, 203, 205. Each column man indicate an example actor associated with the actions therein. For example, column 201 may indicate actions that may be taken by the user 102; column 203 may indicate actions that may be taken by the site 106; and column 205 may indicate actions that may be taken by the third party utility 108.

At 202, the user 102 may direct interaction data 204 to the third party utility 108, via the site 106. The site 106 may receive the interaction data (e.g., via the communication module 116). In some example embodiments, the interaction data 204 may comprise a user ID associated with the user 102. Also, in some example embodiments, the site 106 may identify the user ID associated with the user 102, for example, based on the source of the interaction data 204. At 206, the site 106 may encrypt the user ID to generate an encrypted user ID for the user 102 (e.g., via the encryption management module 114 and/or the encryption module 112). The encrypted user ID may be encrypted to the third party utility 108. For example, the third party utility may not be able to decrypt the encrypted user ID to reveal the clear user ID. At 208, the site 106 may pass the interaction data and encrypted user ID 210 to the third party utility, which may receive the same at 212.

The site 106 (e.g., the encryption module 112) may utilize any suitable encryption algorithm or method that allows the site 106 to encrypt the user ID, but prevents the third party utility 212 from decrypting it. In various example embodiments, the site 106 may utilize a symmetric encryption algorithm having a secret key that is not shared with other components of the system. Any suitable symmetric encryption algorithm may be used including, for example, Advanced Encryption Standard (AES), blowfish, Data Encryption Standard (DES), etc., and derivatives and/or combinations thereof. Also, in various example embodiments, the site 106 may utilize an asymmetric or public key algorithm, such as, RSA, Digital Signature Algorithm (DSA), Pretty Good Privacy (PGP), etc. For example, the site 106 may utilize its own public key to encrypt the user ID. Accordingly, the site's 106 private key may be required to decrypt. Because the site 106 may not share its private key with the third party utility 108, the resulting encrypted user ID may be encrypted to the third party utility 108. It will be appreciated that any size encryption key or keys may be used, for example, depending on the algorithm and desired level of security.

In some example embodiments, the site 106 may maintain a copy of a user's encrypted user ID and thereby obviate the need to re-encrypt the user ID for every piece of interaction data directed to the third party utility 108 from the user 102. For example, the site 106 may encrypt the user's ID upon receipt of a first piece of interaction data directed to the third party utility 108 from the user 102. The site 106 may subsequently store the encrypted user ID, and retrieve it when additional pieces of interaction data are received from the user 102 and directed to the third party utility 108. In this way, processing resources of the site 106 may be conserved.

In some example embodiments, the site 106 may not need to utilize an encryption algorithm that is computationally repeatable. For example, the site 106 may encrypt a user ID by generating a random number in any suitable manner. The random number may serve as the encrypted user ID. For example, the random number may be associated with the user's ID in any suitable manner (e.g., a look-up table). When the site 106 receives subsequent interaction data from the user 102 to the third party utility 108, it may retrieve the random number associated with the user's ID and utilize it as the encrypted user ID. Likewise, when the site 106 receives an encrypted user ID (e.g., in this case a random number) from the third party utility 108, it may derive the proper user ID utilizing the look-up table or other association.

According to various example embodiments, the user ID may be encrypted in a manner that is associated with and/or specific to a particular third party utility 108. For example, a single user 102 may have a different encrypted user ID for each third party with which it interacts. In various example embodiments, this may make it more difficult for third parties to pool data regarding interactions with the user in order to generate a dossier for the user 102 and/or utilize other means to find the identify of the user 102. Third-party specific encrypted user ID's may be generated according to any suitable manner. For example, when a symmetric encryption algorithm is used, the site 106 may utilize a different encryption key for encrypting and decrypting user ID's for each distinct third party utility. In example embodiments utilizing an asymmetric encryption algorithm, the site 106 may utilize a separate public/private key pair for each distinct third party utility. For example embodiments utilizing non-computationally repeatable algorithms, such as the random number method described above, separate associations between user ID's and encrypted user ID's may be maintained for each third party utility.

Figure 3:
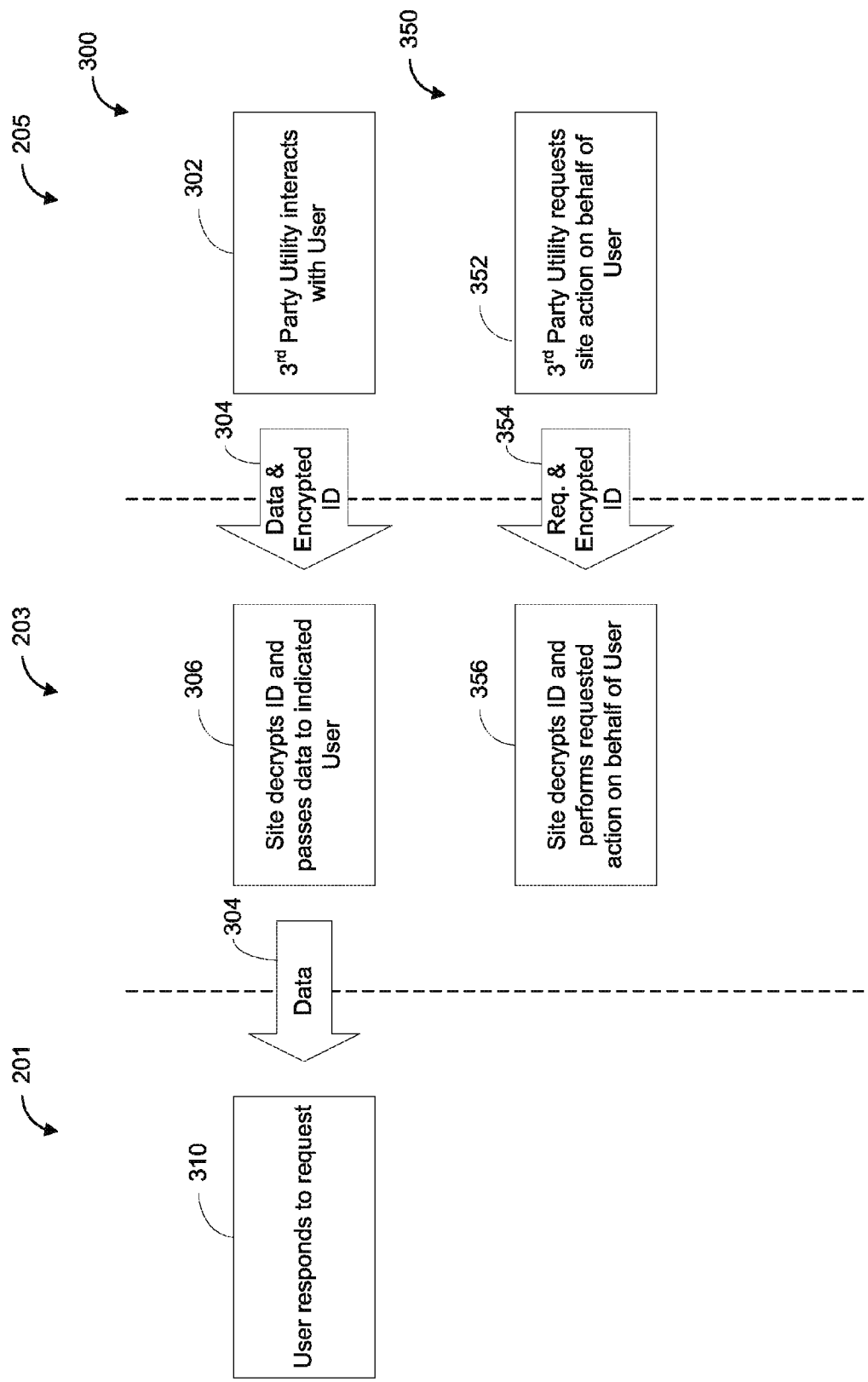
FIG. 3 shows example embodiments of process flows showing a privacy protected interaction between the user and the third party utility with data traveling from the third party utility to the user and the site.

FIG. 3 shows example embodiments of process flows 300, 350 showing a privacy protected interaction between the user 102 and the third party utility 108 with data traveling from the third party utility 108 to the user 102 (300) and the site 106 (350). Referring now to the process flow 300, the third party utility 108 may direct data 304 to the user 102 at 302. The data 304 may include the encrypted user ID associated with the user (and received by the third party utility 108, as described above). For example, the encrypted user ID may serve to identify the user 102 in order to associate the data 304 with the user 102. At 306, the site 106 may decrypt the encrypted user ID. Decrypting the encrypted user ID may involve, applying an encryption key to the encrypted user ID or, in various example embodiments, may involve referring to a look-up table or other associative data structure generated at the time of encryption. Upon decryption, the site 106 may identify the user 102 to whom the data 304 is directed and pass the data 304 to the user. Upon passage to the user 102, the data 304 may or may not include the encrypted user ID and/or the clear user ID.

Referring now to the process flow 350, the third party utility 108 may request at 352 that the site 106 take an action related to the user (e.g., on behalf of the user). For example, the action may be compensation for activities of the user on behalf of the third party or its clients (e.g., taking a survey, viewing advertising or branding material, referencing a brand in published social content, etc.). In various example embodiments, the user 102 may perform the activities on behalf of the third party utilizing the site 106. For example, the user 102 may publish social content including a brand of the third party or its client(s) to the site 106. In some example embodiments, then, the site 106 may verify to the third party utility 108 that the requested activity has been performed. For example, the site 106 may receive from the user 102 a request to publish social content including the brand. The request may also include an indication of the third party utility 108. Upon publishing the social content (e.g., to other users of the site 106) the site 106 may provide a verification to the third party utility 108 including the encrypted ID of the user 102. In some example embodiments, the activities may require the user 102 to access an outside website, for example, to view advertising content. In some of these example embodiments, the third party utility 108 may receive verification of the user's activities directly from the outside website.

The third party utility 108 may reference the user 102 in the request (352) using the encrypted user ID. For example, the request and encrypted user ID 354 may be transmitted to the site 106. The site 106 may decrypt the user ID (e.g., via the encryption management module 114 and/or encryption module 112) and take the requested action on behalf of and/or associated with the user 102 at 356 (e.g., via the user account module 114). The action may be any suitable action. For example, the action may involve providing the user 102 with compensation, such as a credit for downloading an application or other object (e.g., flair, objects within certain games, etc.).

Figure 4:
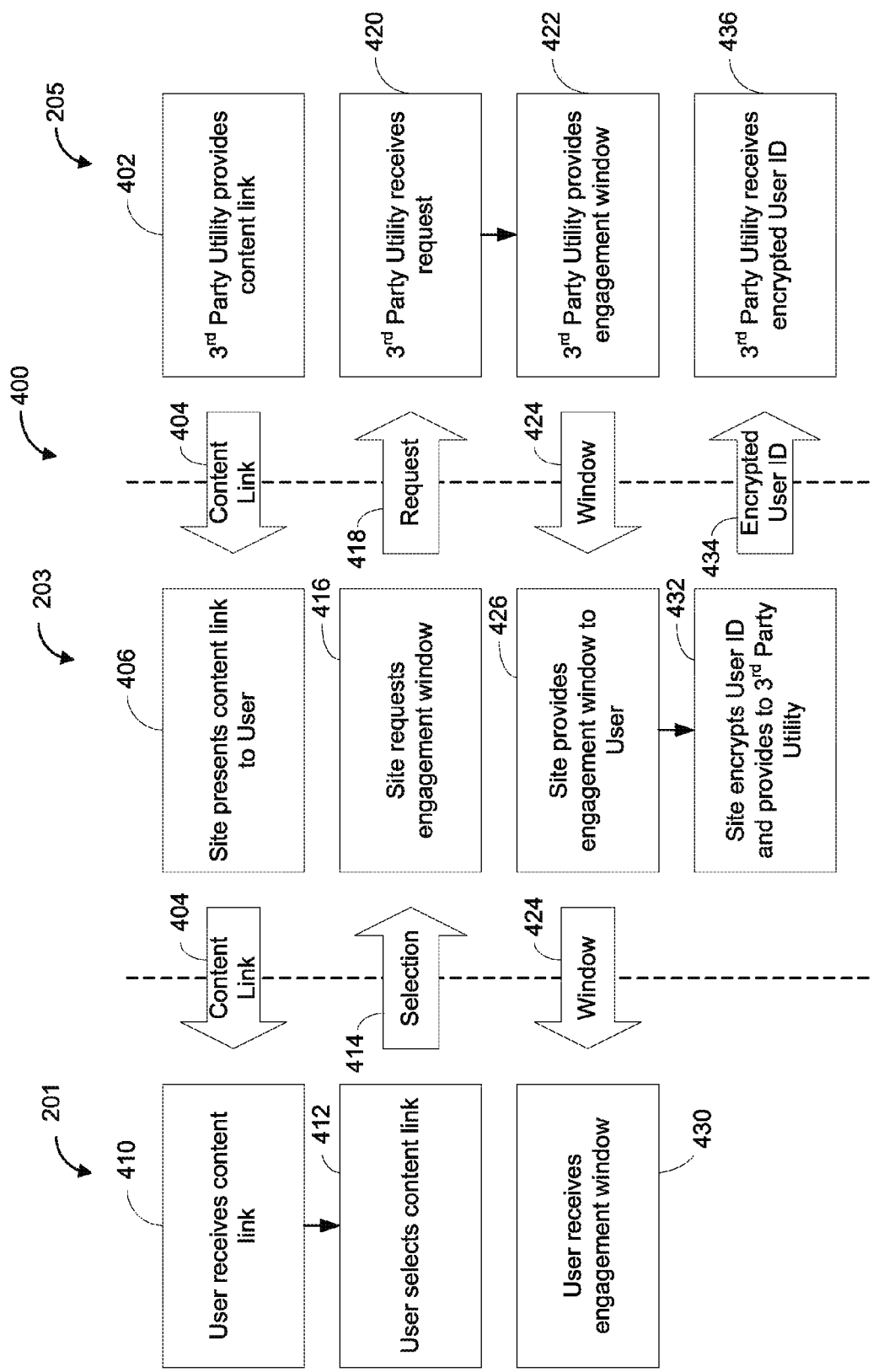
FIG. 4 shows one example embodiment of a process flow showing one example of how contact between a user and a third party utility may be initiated.

FIG. 4 shows one example embodiment of a process flow 400 showing one example of how contact between a user 102 and a third party utility 108 may be initiated. At 402, the third party utility 108 may provide a content link 404 to the site 106. The content link 404 may be expressed in any suitable form. For example, the content link 404 may be a hyperlink pointing to a location of content and/or functionality that may be provided to the user. At 406, the site 106 may present the content link 404 to the user. For example, the content link 404 may be presented to the user 102 via other content provided to the user 102 by the site 104. For example, the content link 404 may be presented as a sidebar or other advertisement presented to the user 102 through the site 106. Also, in some example embodiments, the content link 404 may be presented within social content provided to the site 106 by other users. In various embodiments, the content link may point to content and/or functionality off of the site 106 (e.g., hosted by the third party computer system 126 or another computer system other than the site computer system 110).

The user 102 may receive the content link at 410, and select the content link at 412. It will be appreciated that the user 102 may be shown many different content links, such as the content link 404, but may only select those content links that are of interest to the user 102. By selecting the content link 404, the user 102 may send a content link selection 414 to the site 106. The content selection 414 may be expressed in any suitable language and/or protocol. For example, the content select 414 may be expressed as a hypertext transfer protocol (HTTP) request. The site 106 may receive the content selection 414 and may transmit a request 418 for an engagement window to the third party utility 108. The third party utility 108 may receive the request 418 at 420, and may provide the engagement window 424 to the to the site 106 at 422. The engagement window 424 may be implemented in any suitable form. For example, in various example embodiments, the engagement window 424 may be implemented by a JAVASCRIPT or similarly scripted application that may be executed by one or more of the site 106, the user 102 and/or the third party utility 106. For example, when the engagement window 424 application is executed by the site 106 (e.g., one or more computers hosting the site 106), it may open a communication channel with the third party utility 108, the user 102, or both. The communication channel, in various example embodiments, may be opened according to a secure standard such as, for example, Transport Layer Security (TLS), Security Sockets Layer (SSL), etc.

The user 102 may receive the engagement window 424 at 430. For example, the engagement window 424 may comprise fields for receiving and/or sending communications from the user 102 to the third party utility 108 (e.g., via the site 106). At 432, the site 106 may encrypt the user ID associated with the user 102, for example, as described herein. The encrypted user ID 434 may be provided to the third party utility 108 at 436.

According to various example embodiments, the site 106 may act as an intermediary for communications from the user 102 to the third party utility 106 through the engagement window 424, for example, as illustrated by the process flow 200. The site 106 may also act as an intermediary for communications from the third party utility 106 to the user 102 through the engagement window 424 for example, as illustrated by process flow 300. Further, requests from the third party utility 108 to the site 106 through the engagement window 424 may be handled, for example, as shown by the process flow 350.

Figure 5:
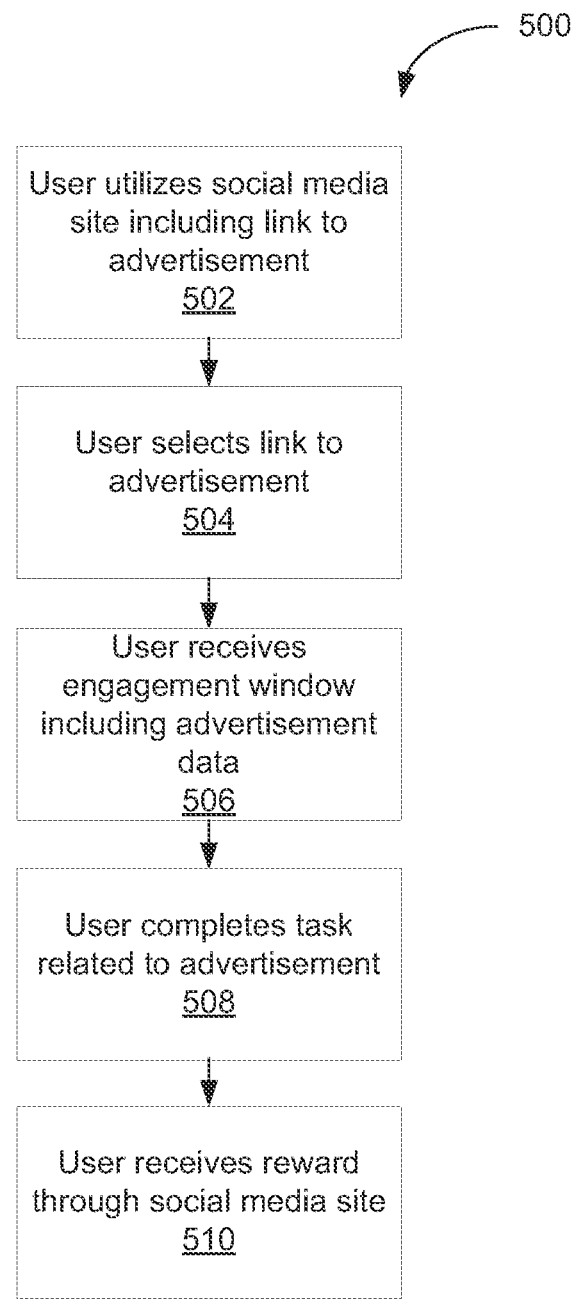
FIG. 5 shows one example embodiment of a process flow for a privacy protected interaction involving a social networking site.

According to various example embodiments, operation of the methods and systems described herein may be implemented in various different contexts that may be transparent to the user 102. FIGS. 5-8 show example embodiments of process flows 500, 600, 700, 800 demonstrating example use cases for privacy protected interactions as described herein. FIG. 5 shows one example embodiment of a process flow 500 showing an example privacy protected interaction involving a social networking site. In the example embodiment illustrated by FIG. 5, the site 106 may be a social networking site, and the user 102 may be a user of the social networking site 106. The third party utility 108 may be implemented by an advertiser or other content provider at the social networking site. At 502, the user 102 may receive a link to an advertisement via the site 106. For example, the link may be describe an application (e.g., a game) available to the user 102 via the site 106. The link, for example, may be similar to the content link 404 described herein. At 504, the user 102 may select the link. At 506, the user may receive an engagement window, such as the window 424 described herein. Communications between the user 102 and the engagement window may be conducted with the site 106 as an intermediary, utilizing an encrypted user ID for the user, as described herein. In this way, the user 102 may remain anonymous to the site 106.

According to various example embodiments, the engagement window may describe a task to be performed by the user 102 in return for compensation. In various example embodiments, the task may be related to advertising. Example tasks may include, for example, completing a survey, viewing advertising content, publishing an impression of a brand to the site 106 as social content, etc. At 508, the user 102 may compete the task. The third party utility 108 may verify that the user 102 has completed the task. For example, the user may complete the task through the third party utility 108 or, in various example embodiments, the site 106 may send the third party utility 108 an indication that the task has been completed. At 510, the user 102 may receive the reward or compensation for completing the task. For example, the third party utility may request that the site 106 provide the compensation, as illustrated by the process flow 350.

Figure 6:
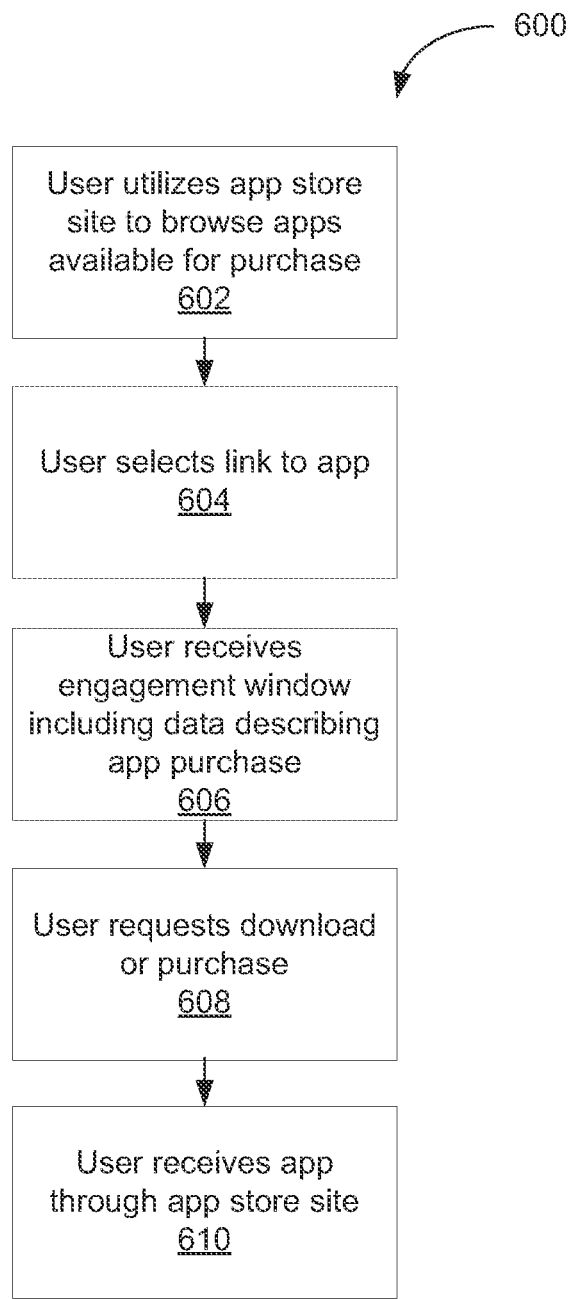
FIG. 6 shows one example embodiment of a process flow for a privacy protected interaction involving an application or "app" store site.

FIG. 6 shows one example embodiment of a process flow 600 showing an example privacy protected interaction involving an application or "app" store site. For example, the site 106 may be a site offering for sale and/or download apps that may be executed by the user device 104. When executed on the user device 104 or another similar device, such apps may provide games or any other useful and/or amusing activity. Example app activities may include, for example, weight tracking, navigation assistance, image editing, etc. The apps may be produced by third party developers and distributed by the developers and/or by distributors. The methods and systems described herein may allow the user 102 to purchase and/or download apps through the app store site without providing identifying information to the third party developers or distributors.

At 602, the user 102 may utilize the site 106 to browse apps that are available for download and/or purchase. For example, the available apps may include apps configured to execute on the user device 104. At 604, the user 102 may select from the site 106 a link to a particular app. At 606, the user 102 may receive an engagement window include data describing the app and/or how to purchase of the app. The engagement window may be similar to the engagement window 424 described above and may be provided by a third party utility 108 that may be executed, for example, by the third party developer and/or a distributor. When opening the engagement window, the site 106 may provide the third party utility 108 implementing the engagement window with an encrypted ID of the user 102, as described herein. In this way, the developer and/or distributor of the app may not receive data that could lead to the identity of the user 102. At 608, the user 102 may complete a purchase and/or download request for the app, for example, by entering information into the engagement window. The third party utility 108 may request that the site 106 deliver the purchased app to the appropriate user 102 utilizing the encrypted ID. Upon decrypting the encrypted ID, the site 106 may identify the appropriate user 102 and deliver the app. In some embodiments (e.g., embodiments where the user 102 purchase the app) a payment request may also be made utilizing the encrypted ID. For example, the third party utility 108, in addition to requesting that the user 102 receive the app, may also request payment (e.g., from a credit card or other account associated with the user 102 at the site 106). The site 106 may charge the credit card or other account of the user 102 and forward the proceeds to the third party app 108.

Figure 7:
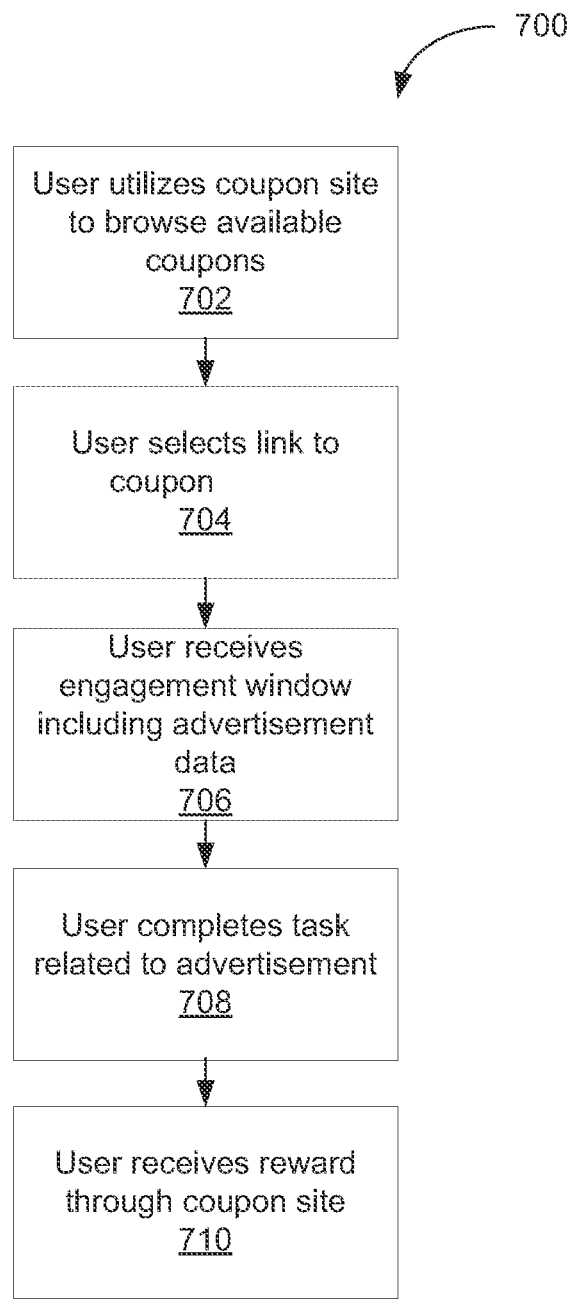
FIG. 7 shows one example embodiment of a process flow for a privacy protected interaction involving a coupon site.

FIG. 7 shows one example embodiment of a process flow 700 showing an example privacy protected interaction involving a coupon site. For example, the coupon site may provide users with access to coupons and/or other promotional offers provided by manufacturers, retailers and/or other third parties. The systems and methods described herein may allow users of the coupon site to interact with manufacturers and other third parties via the coupon site without providing identifying information to the third parties. At 702, the user 102 (e.g., user of the coupon site) may utilize the site 106 (e.g., the coupon site) to browse coupons and/or other promotional offers provided through the site. At 704, the user 102 may select a link to a coupon or promotional offer. In response, the third party utility 108 (e.g., implemented by the third party coupon provider) may provide an engagement window at 706. The site 106 may provide the third party utility 106 with an encrypted ID identifying the user 102. The engagement window may include an advertisement and, in some embodiments, may specify a task to be performed by the user 102. The task may involve, for example, viewing promotional material, taking a survey, etc. The user 102 may complete the task at 708. At 710, the user 102 may receive compensation (e.g., a coupon or other promotion) through the site 106. For example, when the user 102 completes the task, the third party utility 108 may utilize the encrypted ID to request that the site 106 provide the user 102 with the reward.

Figure 8:
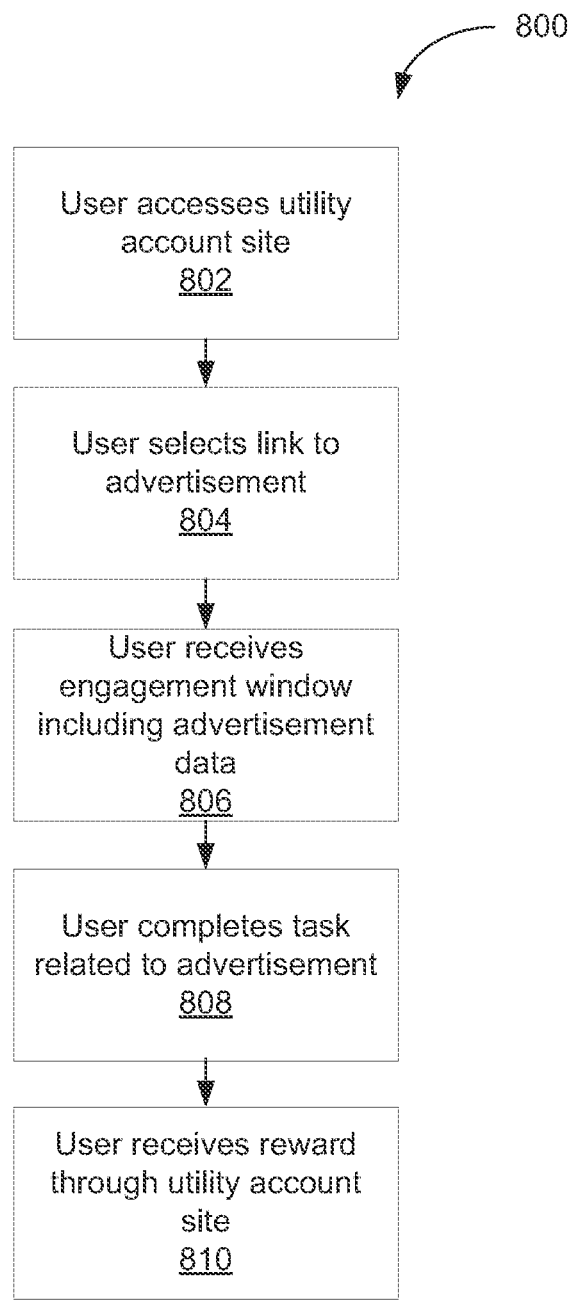
FIG. 8 shows one example embodiment of a process flow for a privacy protected interaction involving an utility account site.

FIG. 8 shows one example embodiment of a process flow 800 for a privacy protected interaction involving an utility account site. For example, the utility account site may be a site that provides users with access to account information regarding a product and/or service provided to the user by the utility. For example, the utility may be a cellular or mobile phone provider and the users may be subscribers. Also, in some embodiments, the utility may be a land-line or voice-over-IP (VOIP) telephone provider, a water company, electric company, gas company, credit card provider, etc. At 802, the user 102 (e.g., utility user) may access the site 106 (e.g., the utility account site). For example, the site 106 may provide the user 102 with functionality for viewing account information (e.g., balance, payment and/or deposit history, available credit, etc.). The type of account activity may depend on the type of product and/or service provided to the user 102 by the utility. The example use cases described by FIGS. 5, 6, 7 and 8 are only examples. The methods and systems described herein may be utilized in any other suitable context. For example, the methods and systems described herein may be utilized in the context of a retail vendor site where the third party utilities may be sub-vendors, advertisers, etc.

Along with account information, the site 106 may provide advertisements provided by one or more third party utilities 108, which may be implemented by a third party or parties (e.g., an advertiser or vendor). In some embodiments, the products and/or services offered by the third party may be related to the utility. For example, when the utility is a mobile phone carrier, the third party may offer mobile phone accessories, applications or "apps" for mobile devices, etc. At 804, the user 102 may select a link to an advertisement provided by a third party utility 108 (e.g., implemented by a third party). At 806, the user 102 may be provided with an engagement window, similar to the window 424, including advertising. The third party utility 108 may be provided with the encrypted ID of the user 102. At 808, the user 102 may complete a task related to the advertisement. The task may include any suitable advertising-related task including, for example, viewing promotional material, taking a survey, etc. Upon completion of the task, the third party utility 108 may utilize the encrypted ID of the user 102 to request that the site 106 provide the user with compensation. The compensation may be related to the utility. For example, the compensation may be minutes of air-time, an app for a user device 104, a utility bill credit, etc.

Privacy protected transactions, as described herein, may also be utilized in other contexts. For example, the third party utility 108 may be executed by a game console (e.g., MICROSOFT X-BOX, SONY PLAYSTATION, NINTENDO WII, etc.), set-top box (e.g., cable box, digital video recorder box, etc.), Internet protocol television (IPTV) provider, etc. The site 106 may be a social networking site, bulletin board site or any other site where users congregate. The site 106 may provide the third party utility 108 with an encrypted ID of the user 102, as described herein. The third party utility 108 may request that the site 106 perform an action related to a game, application or other activity of the user 102 on game console or set-top box. For example, when the third party utility 106 is executed by a game console, the requested action may involve posting the user's score or other game-related information to the site 102 in a manner associated with the user 102. The third party utility 108 may provide the score or game-related information to site 106 along with the user's encrypted ID. The site 106 may decrypt the user's encrypted ID and post the information in a manner associated with the user. When the third party utility 106 is executed by a cable box, digital video recorder box, IPTV provided, etc., the requested action, for example, may relate to a program or recording that the user 102 has viewed or liked. Information describing the program or recording may be provided to the site 106 along with the user's encrypted ID. The site 106 may decrypt the user's encrypted ID and post the information in a manner associated with the user. In this way, the third party utility 108 (e.g., game console, set-top box, etc.) may request that the site 106 take actions specific to the user 102 without knowing the user's identification to the site 106. It will be appreciated that game consoles, set-top boxes, etc. having different functionalities and features may request that the site 106 perform actions related to the user 102 in addition to the example actions described.

In other example embodiments, the third party utility 108 may be executed by an application developer and/or provider. For example, users of the applications may generate scores or other data describing their use of one or more applications. A user, such as user 102, may want to share the scores or other data via a social networking site or other similar site (i.e., site 106). The site 106 may provide the third party utility 108 (e.g., executed by the application developer or provider) with the user's encrypted ID. By utilizing the third party utility 108 and encrypted ID in a privacy protected transaction, as described herein, the user 102 may allow the application developer and/or provider to provide their scores or other data to the site 106 based on the user's encrypted ID.

In still other example embodiments, the third party utility 108 may be executed by a transport navigation system, such as a global positioning system (GPS) or other device. The navigation system may be either a freestanding device or a device installed in a car or other vehicle. The site 106 may be a social networking site, bulletin board or other similar site. The user 102 may utilize the navigation device and may want to post navigation-related information to the site 106 (e.g., locations, trip distances, fuel economy, etc.). The site 106 may provide the third party utility 108 (e.g., executed by the navigation device) with the user's encrypted ID. The navigation device (e.g., via the third party utility 108) may request that the site 106 post such data in a manner associated with the user 102 in an action request including the user's encrypted ID.)

Figure 9:
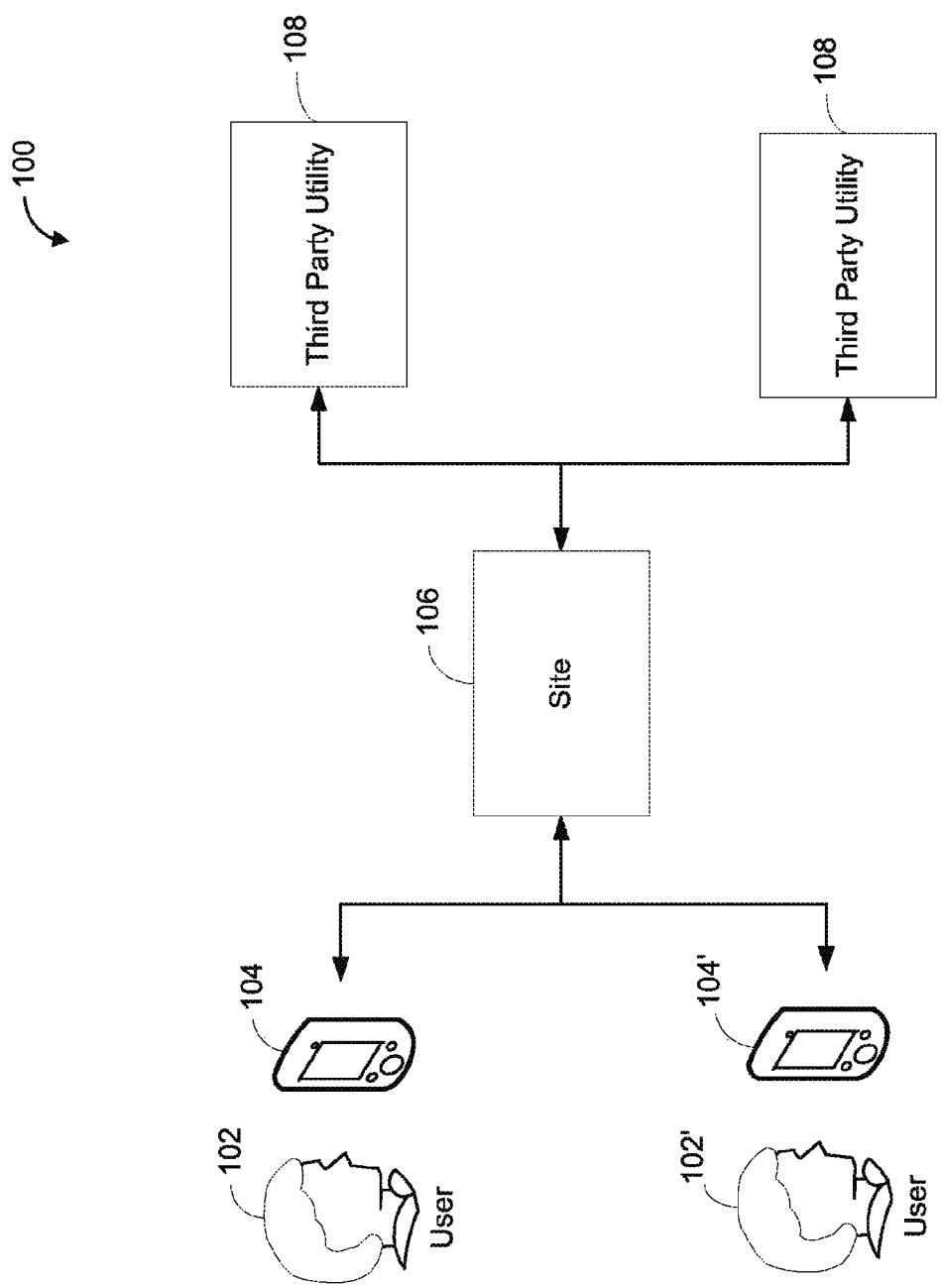
FIG. 9 shows one example embodiment of the system of FIG. 1 comprising multiple users and multiple third party utilities.

It will be appreciated that a single site 106 may interface with more than one third party utility 108 and/or more than one user 102. For example, FIG. 9 shows one example embodiment of the system 100 comprising multiple users 102, 102' and multiple third party utilities 108, 108'. Although two users 102, 102' and two third party utilities 108, 108' are shown, any suitable number of each may be present. As described herein, each encrypted user ID may be associated with the third party utility 108, 108' to which it is directed. For example, each third party utility 108, 108' may have a unique encryption key or set of keys that are used to encrypt user ID's sent to the respective third party utility 108, 108'. In some example embodiments, each unique set of a user 102, 102' and a third party utility 108, 108' may have a separate encryption key or set of keys for encrypting the user's user ID.

Figure 10:
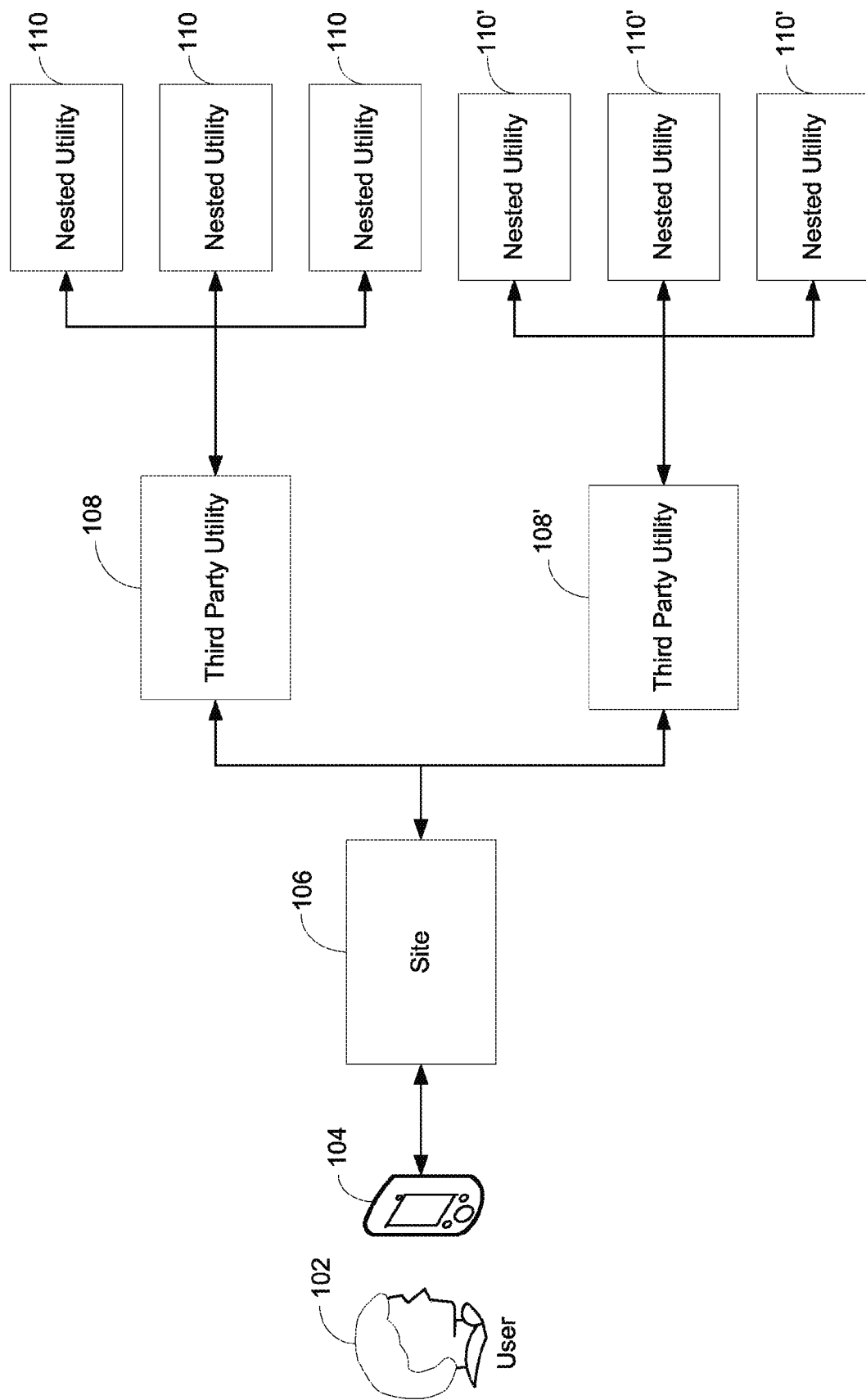
FIG. 10 shows one example embodiment of the system of FIG. 1 with systems and methods for privacy protected interactions implemented in a nested fashion between the user, multiple third party utilities and multiple nested utilities.

In various example embodiments, the systems and methods described herein may be implemented in a nested fashion. FIG. 10 shows one example embodiment of the system 100 of FIG. 1 with systems and methods for privacy protected interactions implemented in a nested fashion between the user 102, multiple third party utilities 108, 108' and multiple nested utilities 110, 110'. Although only one user 102 is shown, additional users may access the utilities 108, 108', 110, 110' in a manner similar to that described. The site 106 may implement privacy protected interactions between the user 102 and the third party utilities 108, 108' as described herein. Instead of, or in addition to, interacting directly with the user 102, however, the third party utilities 108, 108', as illustrated in FIG. 10, may implement additional versions of privacy protected interactions, allowing the user 102 to interact with each individual nested utility 110, 110' in a privacy protected manner.

For example, a third party utility 108 may receive a communication directed to one of its nested utilities 110. As described herein, the third party utility 108 may not receive a clear version of the user's user ID with the communication, but may instead receive an encrypted user ID for the user 102. The third party utility 108 may forward the communication to the appropriate nested utility 110. The third party utility 108 may not, however, send the encrypted user ID to the nested utility 110 but may, instead, encrypt the user ID for a second time. The communication, including the now twice-encrypted user ID, may then be sent to the appropriate nested utility 110. Likewise, communications from a nested utility 110 to the user 102 may be sent to the third party utility 108 including the twice encrypted user ID. The third party utility 108 may decrypt the twice encrypted user ID, resulting in the encrypted user ID. The communication may then be sent to the site 106 including the encrypted user ID. The site 106 may decrypt the encrypted user ID and take an appropriate action (e.g., forward the communication to the user, take a requested action, etc.). In this way, no third party utility 108, 108' may receive a clear user ID of the user 102. Likewise, no nested utility 110 may receive a clear version of the encrypted user ID. In various example embodiments, this may prevent collusion between the nested utilities to identify additional features or characteristics of the user 102, further protecting the user's privacy.

The examples presented herein are intended to illustrate potential and specific implementations of the example embodiments. It can be appreciated that the examples are intended primarily for purposes of illustration for those skilled in the art. No particular aspect or aspects of the examples is/are intended to limit the scope of the described example embodiments. The figures and descriptions of the example embodiments have been simplified to illustrate elements that are relevant for a clear understanding of the example embodiments, while eliminating, for purposes of clarity, other elements.

In general, it will be apparent to one of ordinary skill in the art that at least some of the example embodiments described herein may be implemented in many different example embodiments of software, firmware, and/or hardware. The software and firmware code may be executed by a processor or any other similar computing device. The software code or specialized control hardware that may be used to implement example embodiments is not limiting. For example, example embodiments described herein may be implemented in computer software using any suitable computer software language type, using, for example, conventional or object-oriented techniques. Such software may be stored on any type of suitable computer-readable medium or media, such as, for example, solid state memory (e.g., RAM or ROM), magnetic storage media, or optical storage media. The operation and behavior of the example embodiments may be described without specific reference to specific software code or specialized hardware components. The absence of such specific references is feasible, because it is clearly understood that artisans of ordinary skill would be able to design software and control hardware to implement the example embodiments based on the present description with no more than reasonable effort and without undue experimentation.

Moreover, the processes associated with the present example embodiments may be executed by programmable equipment, such as computers, computer systems, servers, server systems, database systems, and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as memory chips (RAM or ROM), diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary.

A "computer," "computer system," "server," or "server system" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed example embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various example embodiments disclosed herein, a single component may be replaced by multiple components and multiple components may be replaced by a single component to perform a given function or functions. Except where such substitution would not be operative, such substitution is within the intended scope of the example embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer system may comprise one or more processors in communication with memory (e.g., RAM or ROM) via data bus. The data bus may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various example embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to example embodiments of the invention by way of illustration only. Alternative example embodiments of the structures and methods disclosed here may be employed without departing from the principles of what is claimed.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment. Reference to embodiments is intended to disclose examples, rather than limit the claimed invention.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment. Reference to embodiments is intended to disclose examples, rather than limit the claimed invention.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The methods and displays presented herein are not inherently related to any particular computer or other apparatus. Various general-purpose systems may also be used with programs in accordance with the teachings herein, or it may prove convenient to construct more specialized apparatus to perform the required method actions. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for facilitating privacy protected interactions between users of an application store site and a third party utility, the method comprising:
   receiving an advertisement from a third party utility by a computer system hosting an application store site storing a database of computer applications and configured to provide user devices access to the applications;
   providing, by the application store site to a user device, content for presentation on the user device in responses to the user device accessing the application store site, the content including the advertisement received from the third party utility and information associated with the application store site;
   receiving, from the user device by the application store site, a request to communicate with the third party utility;
   responsive to receiving the request, accessing a user account database storing user identification information to retrieve user identification information for the user, and generating using an encryption process by the application store site, an encrypted user identification from the retrieved user identification information, the encrypted user identification information requiring a decryption key to decrypt;
   providing, by the application store site, the encrypted user identification and the request to the third party utility for processing, wherein the decryption key to decrypt the encrypted user identification is not provided by the application store site to the third party utility; and
   storing, by the application store site in a data store, the encrypted user identification.

2. The method of claim 1, further comprising:
   receiving at the application store site a request from the user device for information associated with an application from the database of computer applications, the application developed by an additional third party utility;
   transmitting from the application store site to the additional third party utility the encrypted user identification;
   responsive to the user purchasing the application, transmitting from the application store site the application to the user device.

3. The method of claim 2, wherein the user device communicates with the additional third party utility to purchase the application and delivering the application comprises:
   receiving at the application store site a request from the additional third party utility to deliver the application to the user associated with the encrypted user identification;
   decrypting at the application store site the user identification to identify the user, and transmitting, from the application store site to the user device, the application.

4. The method of claim 1, wherein the advertisement comprises a content link pointing to additional content associated with the third party utility.

5. The method of claim 1, further comprising:
   receiving, at the application store site from the third party utility, an additional request to perform an action related to the user associated with the encrypted user identification;
   decrypting at the application store site the encrypted user identification to identify the user, and
   performing, by the application store site, the action based on the identification of the user.

6. The method of claim 5, wherein the action comprises awarding a credit to the user.

7. The method of claim 1, wherein the user identification associated with the user is encrypted using an encryption key associated with the third party utility.

8. The method of claim 1, further comprising:
receiving, at the application store site from the user, an additional request to communicate with an additional third party utility;
encrypting at the application store site a user identification associated with the user to generate an additional encrypted user identification associated with the additional third party utility;
providing, by the application store site to the additional third party utility, the additional encrypted user identification.

9. The method of claim 8, wherein encrypting the user identification associated with the user comprises encrypting the user identification with an encryption key associated with the additional third party utility.

10. The method of claim 1, further comprising:
receiving, at the application store site from the third party utility, a message directed to the encrypted user identification;
decrypting, at the application store site, the encrypted user identification to identify the user, and
transmitting the message to the user based on the identification of the user.

11. A computer-implemented method for facilitating privacy protected interactions between users of a gaming site and a third party utility, the method comprising:
receiving an advertisement from a third party utility by a computer system hosting a gaming site storing a database of computer executable games and configured to provide user devices access to the games;
providing, by the gaming site to a user device, content for presentation on the user device in responses to the user device accessing the gaming site, the content including the advertisement received from the third party utility and information associated with the gaming site;
receiving, from the user device by the gaming site, a request to communicate with the third party utility;
responsive to receiving the request, accessing a user account database storing user identification information to retrieve user identification information for the user, and generating using an encryption process by the gaming site, an encrypted user identification from the retrieved user identification information, the encrypted user identification information requiring a decryption key to decrypt;
providing, by the gaming site, the encrypted user identification and the request to the third party utility for processing, wherein the decryption key to decrypt the encrypted user identification is not provided by the gaming site to the third party utility; and
storing, by the gaming site in a data store, the encrypted user identification.

12. The method of claim 11, wherein the advertisement comprises a content link pointing to additional content associated with the third party utility.

13. The method of claim 11, further comprising:
receiving, at the gaming site from the third party utility, an additional request to perform an action related to the user associated with the encrypted user identification;
decrypting at the gaming site the encrypted user identification to identify the user; and
performing, by the gaming site, the action based on the identification of the user.

14. The method of claim 13, wherein the action comprises awarding a credit to the user.

15. The method of claim 11, wherein the user identification associated with the user is encrypted using an encryption key associated with the third party utility.

16. The method of claim 11, further comprising:
receiving, at the gaming site from the user, an additional request to communicate with an additional third party utility;
encrypting at the gaming site a user identification associated with the user to generate an additional encrypted user identification associated with the additional third party utility;
providing, by the gaming site to the additional third party utility, the additional encrypted user identification.

17. The method of claim 16, wherein encrypting the user identification associated with the user comprises encrypting the user identification with an encryption key associated with the additional third party utility.

18. A computer-implemented method for facilitating privacy protected interactions between users of a media site and a third party utility, the method comprising:
receiving an advertisement from a third party utility by a computer system hosting a media site storing a database of media files and configured to provide user devices access to media files;
providing, by the media site to a user device, content for presentation on the user device in responses to the user device accessing the media site, the content including the advertisement received from the third party utility and information associated with the media site;
receiving, from the user device by the media site, a request to communicate with the third party utility;
responsive to receiving the request, accessing a user account database storing user identification information to retrieve user identification information for the user, and generating using an encryption process by the media site, an encrypted user identification from the retrieved user identification information, the encrypted user identification information requiring a decryption key to decrypt;
providing, by the media site, the encrypted user identification and the request to the third party utility for processing, wherein the decryption key to decrypt the encrypted user identification is not provided by the computer system to the third party utility; and
storing, by the media site in a data store, the encrypted user identification.

19. The method of claim 18, further comprising:
receiving, at the media site from the third party utility, an additional request to perform an action related to the user associated with the encrypted user identification;
decrypting at the media site the encrypted user identification to identify the user, and performing, by the media site, the action based on the identification of the user.

20. The method of claim 18, wherein the action comprises awarding a credit to the user.

* * * * *